(12) United States Patent
Morita et al.

(10) Patent No.: US 6,777,680 B2
(45) Date of Patent: Aug. 17, 2004

(54) INFRARED DETECTING DEVICE

(75) Inventors: Shinichi Morita, Kanagawa (JP); Nami Shibata, Saitama (JP)

(73) Assignee: IHI Aerospace Co., Ltd., Tokyo (JP)

( * ) Notice: Subject to any disclaimer, the term of this patent is extended or adjusted under 35 U.S.C. 154(b) by 323 days.

(21) Appl. No.: 09/988,365

(22) Filed: Nov. 19, 2001

(65) Prior Publication Data

US 2002/0060291 A1 May 23, 2002

(30) Foreign Application Priority Data

Nov. 22, 2000 (JP) ........................................ 2000-356514

(51) Int. Cl.[7] ............................................. H01L 31/00
(52) U.S. Cl. ..................................... 250/338.1; 250/330
(58) Field of Search ................................. 250/330, 332, 250/338.1, 338.3, 338.4, 339.02, 340

(56) References Cited

U.S. PATENT DOCUMENTS

| 5,583,058 | A | * | 12/1996 | Utsumi et al. ................... 437/3 |
| 5,662,818 | A | | 9/1997 | Nomura et al. |
| 5,689,087 | A | | 11/1997 | Jack |

FOREIGN PATENT DOCUMENTS

| EP | 1 083 609 A1 | 3/2001 |
| JP | 4-76065 U | 7/1992 |
| JP | 11-108760 | 4/1999 |

OTHER PUBLICATIONS

Computer translation of Japanese unexamined patent application 11–108760.*
Patent Abstracts of Japan abstracting JP 02–205729, published Aug. 15, 1990.
Patent Abstracts of Japan, abstracting JP 7–198474, published Aug. 1, 1995.
Patent Abstracts of Japan, abstracting JP 7–167708, published Jul. 4, 1995.
Patent Abstracts of Japan, abstracting JP 2–165025, published Jun. 26, 1990.
Patent Abstracts of Japan, abstracting JP 3–94127, published Apr. 18, 1991.

* cited by examiner

*Primary Examiner*—Constantine Hannaher
*Assistant Examiner*—Timothy Moran
(74) *Attorney, Agent, or Firm*—Sughrue Mion, PLLC

(57) ABSTRACT

A large-area high-output infrared detecting device S is realized in which a heat-separation-structure diaphragm 2 made of a thermal insulating material is formed through a cavity 7 from a silicon substrate 1, a thermocouple 4 serving as an infrared detection section is formed on the diaphragm 2, a heat absorption area 5 is formed on the thermocouple 4 through insulation layers 3a and 3b so as to have an etching aperture 9 for forming a cavity in the heat absorption area 5 and the cavity 7 is formed in a short time without being influenced by the size of the heat absorption area 5 to secure a structural strength.

5 Claims, 3 Drawing Sheets

INFRARED DETECTING DEVICE

BACKGROUND OF THE INVENTION

1. Field of the Invention

The present invention relates to an infrared detecting device.

2. Description of the Prior Art

In general, an infrared detecting device includes the thermopile type, pyroelectric type, and bolometer type. For example, a thermopile infrared detecting device includes the types shown in FIGS. 2 and 3.

In the case of thermopile infrared detecting devices S1 and S2 shown in FIGS. 2 and 3, a diaphragm 102 is formed on a silicon (Si) substrate 101 and p-type polysilicon 110 and n-type polysilicon 111 are alternately connected by an aluminum (Al) wiring 112 to form a pair of thermocouples 113 on the diaphragm 102. The thermocouples 113 are arranged in parallel by using the substrate 101 as a cold junction and a heat absorption area 105 as a hot junction and electrically connected in series to form thermopiles. Moreover, the heat absorption area 105 is formed on the diaphragm 102 in which the thermopiles are arranged through an insulation layer 103. In this case, the heat absorption area 105 is present at the center of the device. Moreover, thermoelectromotive forces of the infrared detecting devices S1 and S2 are decided by the temperature difference between the heat absorption area 105 and the substrate 101. The temperature difference depends on the magnitude of the thermal resistance from an end of the heat absorption area 105 up to ends of cavities 106A and 106B of the substrate 101.

The cavities 106A and 106B formed on the substrate 101 thermally separate the cold junction side of the thermocouples 113 from the hot junction side of them. In the case of the infrared detecting device S1 shown in FIG. 2, the cavity 106A is formed by applying anisotropic etching to silicon from the back of the substrate 101 and thereby leaving the outer periphery of the device like a frame. In the case of the infrared detecting device S2 shown in FIG. 3, the quadrangular-pyramidal cavity 106B opening at the upper side of the substrate 101 below the diaphragm 102 is formed by forming an etching aperture 107 at four corners of the diaphragm 102 and then applying anisotropic etching to silicon.

In the case of the above conventional infrared detecting devices S1 and S2, however, when forming the cavity 106A (FIG. 2) by leaving the outer periphery of the device like a frame, it is necessary to etch a volume equal to or more than a necessary volume of the substrate 101. Therefore, the etching time, that is, the time in which the substrate 101 is exposed to an etching solution is increased and thereby, a protective film such as the insulation layer 103 or the like is damaged. Moreover, to improve the output of the device, it is necessary to increase the heat absorption energy, that is, the area of the device. However, it is difficult to support the structural strength of the large-area device only by the diaphragm 102. Therefore, it is attempted to form a device by using means for increasing the thickness of the diaphragm 102 or means for moderating the stress of each layer. However, even when using these means, it is difficult to completely secure the structural strength of the device and moreover, a problem occurs that the sensitivity of the device is deteriorated by increasing the thickness of the diaphragm 102.

Moreover, in the case of forming the cavity 106B by forming the etching aperture 107 at four corners of the diaphragm 102 (FIG. 3), it is possible to support most of the structural strength of the device by the silicon substrate 101 and many problems do not occur in the structural strength of the device because of etching away only a part of the upper face of the substrate 101. However, because sizes of the etching apertures 107 are restricted, the distance between the etching apertures 107 is restricted by the thickness of the substrate 101, and positions of the etching apertures 107 are restricted to the outer periphery of the substrate 101, it is difficult to apply the case to a device having a dimension larger than the thickness of the substrate 101 and realize a high-output device for increasing heat absorption energy.

That is, the conventional infrared detecting devices S1 and S2 have a problem that it is difficult to increase areas of the devices in order to increase outputs of them. Thus, it is necessary to solve the problem.

SUMMARY OF THE INVENTION

The present invention is made to solve the above conventional problem and its object is to provide a large-area high-output infrared detecting device.

The infrared detecting device according to the present invention is characterized in that a heat-separation-structure diaphragm made of a thermal insulating material is formed through cavities from a silicon substrate, an infrared detection section is formed on the diaphragm, a heat absorption area is formed on the infrared detection section through an insulation layer, and an etching aperture for forming cavities is formed in the heat absorption area, the infrared detecting device according to a preferred embodiment of the present invention has a configuration in which a plurality of etching apertures are formed in the heat absorption area, the infrared detecting according to another embodiment of the present invention has a configuration in which the plurality of etching apertures are formed in the heat absorption area at equal intervals, the infrared detecting device according to the other embodiment of the present invention has a configuration in which a plurality of etching apertures are also formed on the diaphragm other than the heat absorption area, the infrared detecting device according to further embodiment of the present invention has a configuration in which the cavity is formed through anisotropic etching, and the infrared detecting device according to the other preferred embodiment of the present invention has a configuration in which the infrared detecting device is a thermopile type. The above configurations serve as means for solving the conventional problem.

In the case of the above configurations, when forming one etching aperture in a heat absorption area, it is preferable to form the etching aperture at the center of the heat absorption area. When fabricating the device concerned, cavities are formed on a silicon substrate by applying anisotropic etching to the substrate through the etching aperture to control depths of the cavities in accordance with the etching time. Moreover, in the case of the configuration having a plurality of etching apertures in a heat absorption area at equal intervals, it is preferable to properly set sizes of and the interval between etching apertures in accordance with the size of a cavity to be formed and the etching time of the cavity. In this case, etching can be optimized by setting a plurality of etching apertures at equal intervals. However, when the etching time to be set has an allowance, it is not always necessary to set the etching apertures at equal intervals. Moreover, in the case of the configuration in which a diaphragm is formed on a substrate, it is possible to form a sacrifice layer made of polymer or polysilicon in a proper thickness between the substrate and the diaphragm. When fabricating the device concerned, it is possible to form cavities by applying isotropic etching to a sacrifice layer and then applying anisotropic etching to a silicon substrate. According to the infrared detecting device of the present invention, because an etching aperture is formed in a heat absorption area of the infrared detecting device, it is possible to apply anisotropic etching to a silicon substrate through the etching aperture, form almost-concave cavities opening at the heat absorption area side on the substrate, fabricate an infrared detecting device having an area larger than the thickness of the substrate, form substrate cavities for thermally separating the cold junction of a thermopile from the hot junction of it independently of the size of the heat absorption area in a short time, and eliminate a fear of damaging a protective film such as an insulation layer in accordance with reduction of etching time. Moreover, because cavities are formed by leaving the bottom of the substrate, it is possible to secure a sufficient structural strength by the substrate and thereby, decrease the thickness of a diaphragm, and improve the sensitivity of the infrared detection. Furthermore, because a large heat absorption area can be secured and the incoming quantity of infrared energy can be increased, it is possible to realize a large-area high-output infrared detecting device.

According to the infrared detecting device of a preferred embodiment of the present invention, it is possible to obtain the same advantage as described above and realize a high-output infrared detecting device having a dimension larger than the thickness of a silicon substrate such as a large area of 1×1 mm or more.

According to the infrared detecting device of another preferred embodiment of the present invention, it is possible to obtain the same advantage as described above and a plurality of etching apertures are formed at equal intervals. Therefore, when fabricating the infrared detecting device, it is possible to uniformly distribute cavity shapes and flexibly optimize the size of a cavity by setting the size of an etching aperture and the interval between etching apertures and etching time.

According to the infrared detecting device of the other preferred embodiment of the present invention, it is possible to obtain the same advantages as described above, increase the distance between cold junction and hot junction of a thermopile by forming a thermopile on a substrate through a diaphragm and forming an etching aperture also on the diaphragm other than a heat absorption area, narrow an area in which heat leaks from the heat absorption area toward the substrate through the etching aperture formed on the diaphragm due to its structure, and improve the sensitivity of the infrared detecting device.

According to the other preferable embodiment of the present invention, it is possible to realize an infrared detecting device having a large area without sticking the diaphragm and the substrate by etching the substrate through anisotropic etching in addition to the same advantages as described above.

According to the infrared detecting device of the further preferred embodiment of the present invention, it is possible to obtain the same advantages as described above, coexist with a CMOS process because the infrared detecting device is a thermopile type infrared detecting device and a thermocouple of p-type polysilicon and n-type polysilicon is used, and constitute a large-area thermopile infrared detection section and a circuit section in a silicon substrate. Thereby, functions of the circuit and the infrared detection section are mounted on a silicon chip, the infrared detecting device can be applied to a system using a one-chip infrared detecting device, and it is possible to reduce the system using the infrared detecting device in size and weight. Moreover, it is possible to reduce the price including a circuit board by batch process of silicon.

DETAILED DESCRIPTION OF THE PREFERRED EMBODIMENTS

Figure 1A:
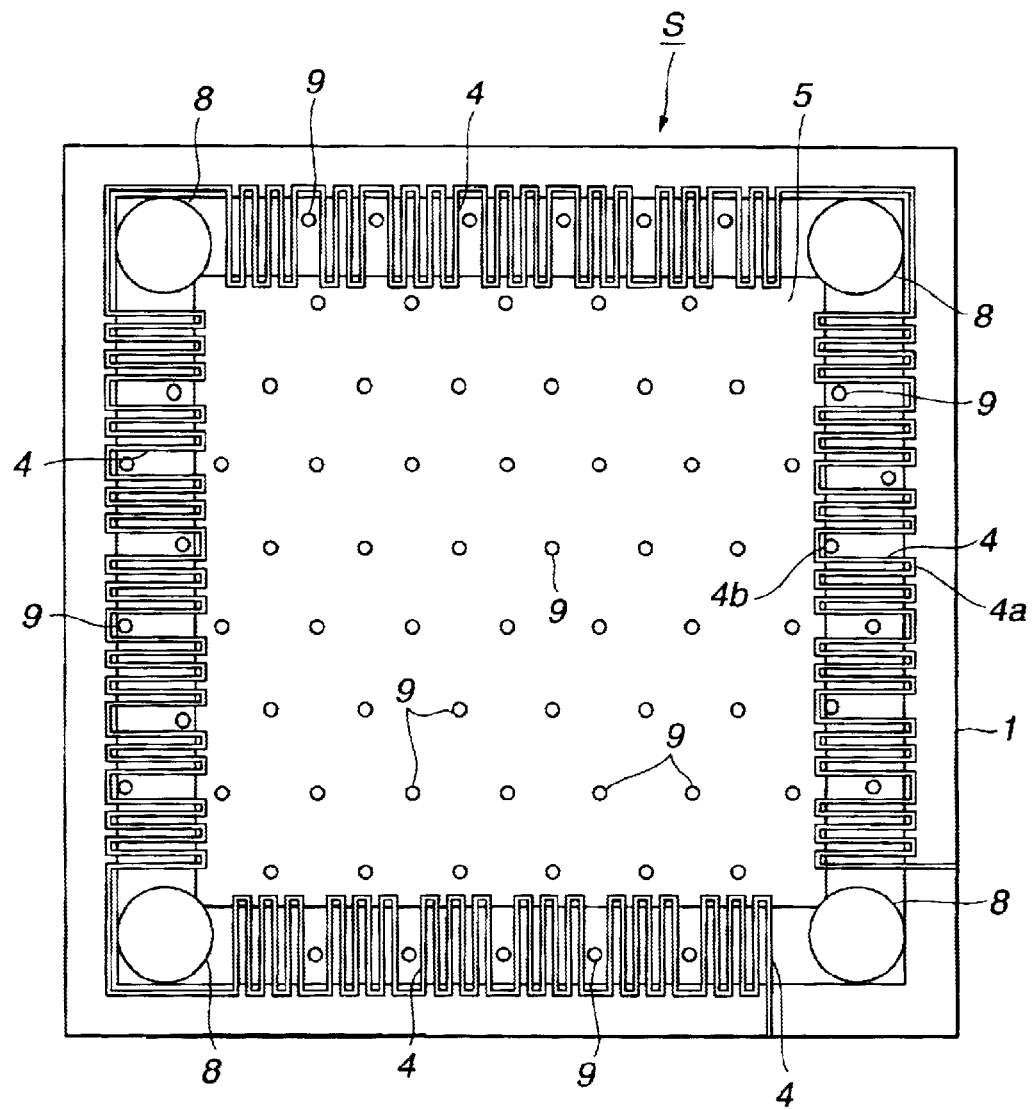
FIGS. 1A and 1B are a top view and a sectional view for explaining an embodiment of an infrared detecting device of the present invention.

The infrared detecting device S shown in FIG. 1 is a thermopile infrared detecting device as an embodiment, in which a diaphragm 2 made of silicon nitride ($Si_3N_4$) is formed on a silicon (Si) substrate 1 as a heat-separation-structure diaphragm made of a thermal insulating material, a plurality of conventionally-known thermocouples 4 serving as infrared detection sections are arranged on the diaphragm 2 together with a plurality of insulation layers 3a and 3b, and an infrared absorption material is layered on the uppermost insulation layer 3a, whereby a heat absorption area (heat absorption film) 5 is formed on the layered material. When using gold-black as an infrared absorption material, it is allowed to layer a material having a good mutual diffusion property with gold-black such as amorphous silicon on the uppermost insulation layers 3a and 3b. In this case, the heat absorption area 5 is formed at the center of the device and the thermocouples 4 are arranged in parallel while using the substrate 1 side as a cold junction 4a and the heat absorption area 5 side as a hot junction 4a and electrically connected in series. Moreover, in the case of this embodiment, a sacrifice layer 6 made of polymer or polysilicon is formed between the substrate 1 and the diaphragm 2 to simplify etching.

An almost-concave cavity 7 which opens on the heat absorption area 5 side (upper side) to thermally separate the cold junction 4a side and hot junction 4a side of each thermocouple 4 from each other is formed below the diaphragm 2 of the substrate 1. The heat absorption area 5 is formed at the center of the device S so as to cover the hot junction 4a of each thermocouple. The thermocouples 4 are arranged on the diaphragm 2, which are set between the outer periphery of the device S and the heat absorption area 5 and the cold junction 4a side and hot junction 4a side are thermally separated from each other by the cavity 7.

To fabricate the above infrared detecting device S, a comparatively-large etching apertures 8 having diameters almost equal to the distance between the junctions 4a and 4b of the thermocouple 4 are formed at four corners of the diaphragm 2, a plurality of etching apertures 9 extending from the surface of the heat absorption area 5 to the substrate 1 through the insulation layers 3a and 3b and the diaphragm 2 are formed in the heat absorption area 5 at equal intervals, and moreover a proper number of etching apertures 9 are formed on portions other than the heat absorption area 5 on the diaphragm 2. These etching apertures 8 and 9 can be formed through dry etching or plasma working. Moreover, the total area of the etching apertures 9 in the heat absorption area 5 is very small compared to the area of the heat absorption area 5 and the influence of the total area on heat absorption is very small.

The sizes of the etching apertures 9 which are formed in the heat absorption area 5 and the diaphragm 2 other than the heat absorption area, and the intervals therebetween are set in accordance with the depth and etching time of the cavity 7 to be formed. More specifically, when assuming the diameter of each etching aperture 9 as 20 μm and the interval between the etching apertures 9 as approx. 200 μm, the depth of the cavity 7 becomes 140 μm when the position immediately below the diaphragm 2 becomes the cavity 7. This is a case of etching the sacrifice layer 6 at an etching rate of 2 μm/min for approx. 60 min.

Then, when the infrared detecting device of this embodiment is fabricated, the etching apertures 8 and 9 are formed as described above and then isotropic etching is applied to the sacrifice layer 6 by supplying an etching solution through the etching apertures 8 and 9.

Then, by supplying the etching solution through the etching apertures 8 and 9, anisotropic etching is performed along the crystal orientation of the silicon substrate 1. The above isotropic etching and anisotropic etching are simultaneously progressed. In this case, the sacrifice layer 6 prevents anisotropic etching from progressing to the device outer-periphery side of the substrate 1. Therefore, the cavity 7 does not excessively expand.

Figure 1B:
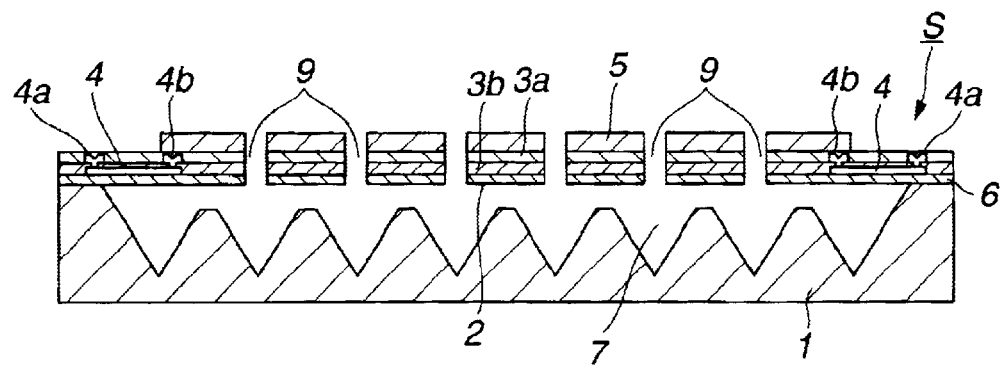
Figure 2A:
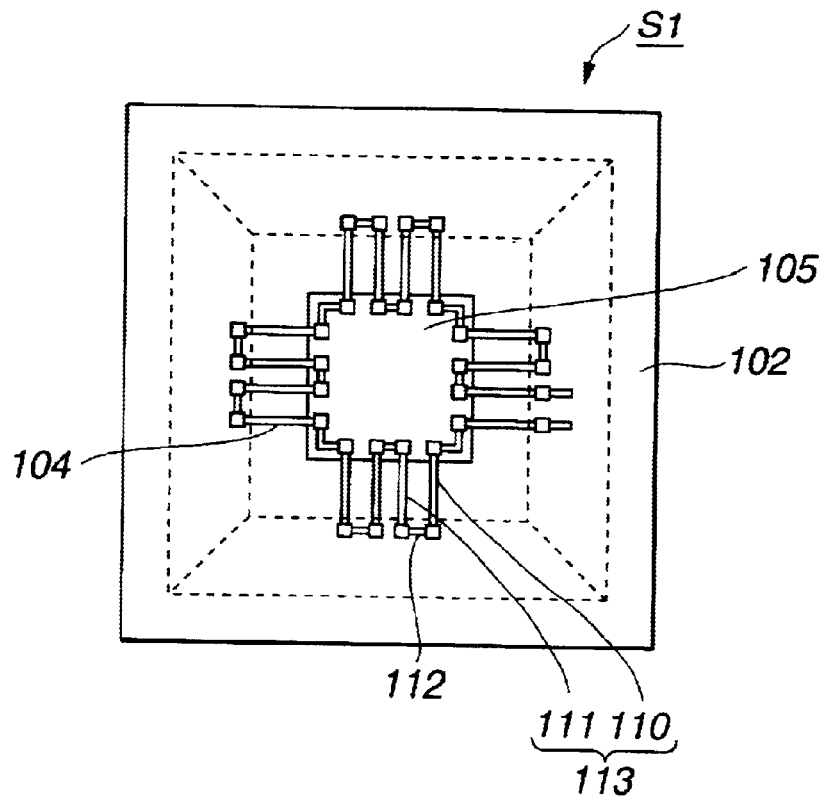
FIGS. 2A and 2B are a top view and a sectional view for explaining a conventional infrared detecting device.
Figure 2B:
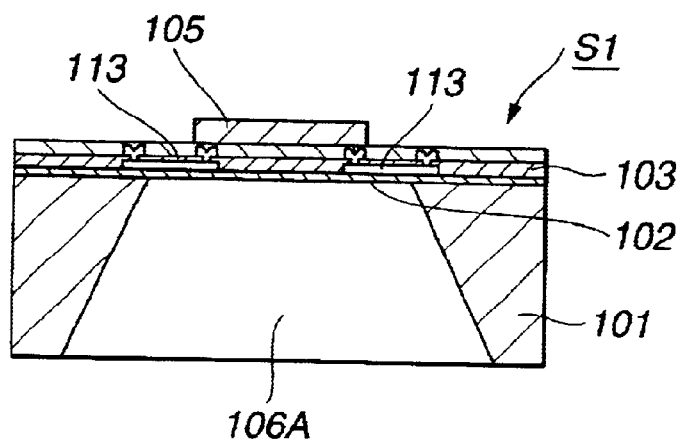
Figure 3A:
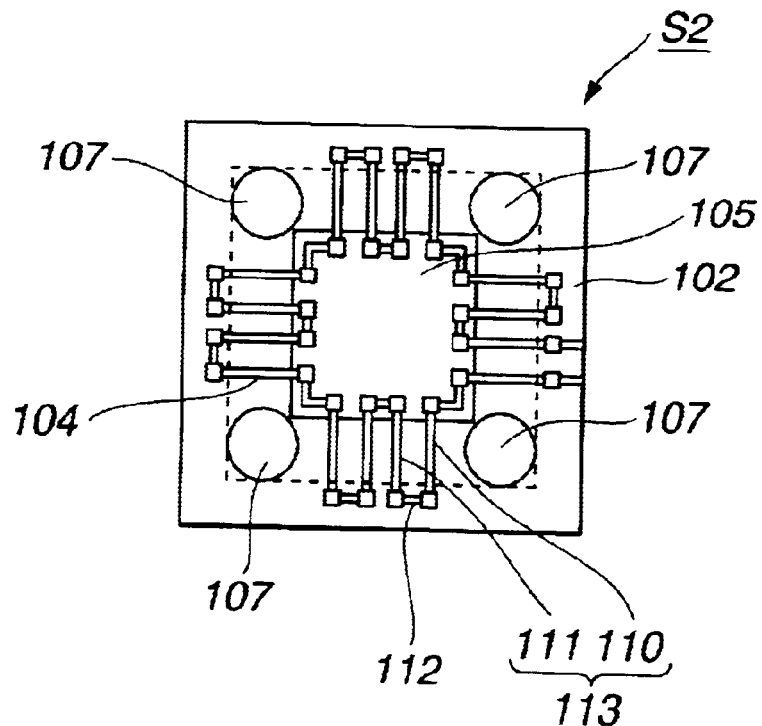
FIGS. 3A and 3B are a top view and a sectional view for explaining another conventional infrared detecting device.
Figure 3B:
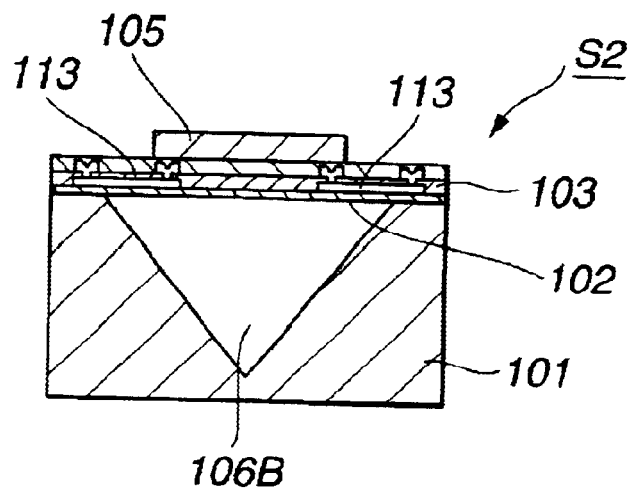

Moreover, the cavity 7 which opens on the upper side and whose bottom forms bumps is formed as shown in FIG. 1B by discharging the etching solution when a preset etching time elapses.

Thus, in the case of the infrared detecting device of the above embodiment, the cavity 7 for thermally separating the cold junction 4a and hot junction 4b of each thermocouple 4 from each other is formed in a short time without being influenced by the size of the heat absorption area 5 by applying anisotropic etching to the silicon substrate 1 through the etching apertures 9 formed in the heat absorption area 5 and on the diaphragm 2 other than the heat absorption area 5 as well as the etching apertures 8 formed at four corners of the diaphragm 2 and thereby the etching time is decreased. Therefore, the diaphragm 2 and protective films such as the insulation layers 3a and 3b are not damaged or the structural strength becomes sufficient because the cavity 7 is formed by leaving the bottom of the substrate 1. Therefore, even in the case of the large-area device S, the sticking phenomenon does not occur in which the diaphragm 2 deflects and contacts the bottom of the cavity 7. Moreover, because the etching apertures 9 are formed in the heat absorption area 5 at equal intervals, bumps on the bottom of the cavity 7 are uniformly distributed and this makes it possible to secure a structural strength. Thereby, it is possible to realize a high-output infrared detecting device S having a large area of 1×1 mm or more.

Moreover, as structural features of the infrared detecting device S after fabricated, because the etching apertures 9 are formed in areas other than the heat absorption area 5 on the diaphragm 2, the size of the cavity 7 becomes large enough to thermally separate the cold junction 4a and hot junction 4b of each thermocouple 4 from each other and it is possible to reduce the leak of heat to the substrate 1 side from the heat absorption area 5 in the diaphragm 2, increase the distance between the cold junction 4a and the hot junction 4b, and improve the sensitivity of the infrared detecting device S.

The detailed configuration of an infrared detecting device of the present invention is not restricted only to the above embodiment.

What is claimed is:

1. An infrared detecting device comprising a heat-separation-structure diaphragm made of a thermal insulating material separated by a cavity from a silicon substrate, an infrared detection section formed on said diaphragm, and a heat absorption area separated from said infrared detection section by an insulation layer, wherein said heat absorption area is formed with an etching aperture for forming the cavity and said diaphragm is also formed with a plurality of etching apertures in an area different from said heat absorption area.

2. An infrared detecting device according to claim 1, wherein said heat absorption area is formed with a plurality of etching apertures.

3. An infrared detecting device according to claim 2, wherein said plurality of etching apertures are formed at equal intervals.

4. An infrared detecting device according to claim 1, wherein said cavity is mainly formed through anisotropic etching.

5. An infrared detecting device according to claim 1, wherein said infrared detecting device is a thermopile type.

* * * * *